United States Patent [19]

Rosenberger et al.

[11] 3,928,446

[45] Dec. 23, 1975

[54] PREPARATION OF 3-OXO-19-NOR-$\Delta^4$-STEROIDS FROM 10-[3-SUBSTITUTED-ALKYL]-DESASTEROIDS

[75] Inventors: Michael Rosenberger, Caldwell; Gabriel Saucy, Essex Fells, both of N.J.

[73] Assignee: Hoffmann-La Roche Inc., Nutley, N.J.

[22] Filed: Apr. 11, 1974

[21] Appl. No.: 459,979

[52] U.S. Cl.......... 260/566 AE; 260/469; 260/490; 260/566 R; 260/566 A; 260/566 B
[51] Int. Cl.[2]...................................... C07C 131/02
[58] Field of Search..... 260/566 A, 566 R, 566 AE, 260/566 B, 490, 469

[56] References Cited
FOREIGN PATENTS OR APPLICATIONS
7,001,893    1970    South Africa

*Primary Examiner*—Gerald A. Schwartz
*Attorney, Agent, or Firm*—Samuel L. Welt; Jon S. Saxe; Raymond R. Wittekind

[57] ABSTRACT

An improved process for converting 10-[3-substituted-alkyl]-19-nor-desA-steroids to pharmaceutically valuable 3-oxo-$\Delta^4$-19-nor steroids via oxime and hydrazine derivatives is described. The end-products are a known class of steroids which are useful as hormonal agents.

8 Claims, No Drawings

PREPARATION OF 3-OXO-19-NOR-Δ⁴-STEROIDS FROM 10-[3-SUBSTITUTED-ALKYL]-DESASTEROIDS

RELATED APPLICATIONS

The present application is based upon co-pending application, Ser. No. 17,964, filed Mar. 9, 1970, which is a continuation-in-part of Ser. No. 813,693, filed Apr. 4, 1969, now abandoned, the benefit of the filing date of which is hereby claimed.

BACKGROUND OF THE INVENTION

In recent years much effort has been devoted to the total synthesis of steroids. On such synthesis is the approach disclosed and claimed in U.S. Patent of Gabriel Saucy, Pat. No. 3,544,598 and abandoned U.S. Patent applications, Ser. Nos. 633,730, filed Apr. 26, 1967, 604,124, filed Dec. 23, 1966 and 549,816, filed May 13, 1966. Briefly, the Saucy approach comprises reacting a 7-substituted-3-oxo-1-heptene or variant thereof with 2-alkyl-cycloalkane-1,3-dione yielding a 3-substituted-6a-β-alkyl-cyclopenta[f][1]benzopyran or naphtho [2,1-b]pyran. The latter compounds are then subjected to a selective catalytic hydrogenation followed by the introduction of a hydroxy, alkoxy or acyloxy group at the 4a-position to produce a 3-substituted-6aβ,4a-hydroxy, alkoxy or acyloxy perhydrocyclopenta[f][1]benzopyran or perhydronaphtho [2,1-b]pyran. By means of one of the alternative approaches disclosed therein, these pyrans are then converted to 10-[3-substituted-alkyl]-19-nor-desA-steroids (hereinafter represented by Formula I) which in turn are converted to known pharmaceutically valuable steroidal materials.

This invention provides an alternative route to that which is disclosed in the prior Saucy applications referenced above for converting 10-[3-substituted-alkyl]-19-nor-desA-steroids to known pharmaceutically valuable 19-nor steroids. By the methods of the present invention, one is able to obtain valuable steroid end-products is extremely high yields. The 3-keto-Δ⁴19-nor-steroid end products are a known class of compounds having hormonal activity, particularly anabolic/androgenic, progestational and antiestrogenic activity. Additionally, these compounds are readily convertible by A-ring armatization to steroids of the estrane series having, for the most part, estrogenic activity. A compilation of many of the 19-norsteroids obtainable by the present process, as well as a discussion of the biological properties, may be found in Applezweig, "Steroid Drugs", McGraw Hill, 1962. Additional leading references to this class of compounds are:

Colton, et al, J.A.C.S., 79, 1123 (1957);
U.S. Pat. 3,442,918;
U.S. Pat. 2,712,871;
U.S. Pat. 3,427,389; and
U.S. Pat. 2,744,122.

A compilation of A-ring aromatizations of 19-norsteroids may be found in Djerassi, "Steroid Reactions", Holden-Day, 1963, Chapter 9, Section 5. One particularly valuable steroid end-product obtained by the methods disclosed herein is norgestrel (13β-ethyl-17α-ethynyl-17-hydroxy-gon-4-ene-3-one). Preparation of this compound requires the introduction of an α-ethynyl group in the C-17 position at some convenient stage in the process. The introduction of the ethynyl group into the steroid nucleus in high yields is a delicate step which is often associated with subsequent loss of this group in later process steps in the synthesis. Preparation of the 17α-ethynyl derivatives is greatly faciliated by the process of the instant invention in that the grouping can be introduced several stages before the conclusion of the synthesis without subsequent loss thereof. This is so since the ethynyl group is stable to the process conditions employed herein. Moreover, by-product formation has been substantially reduced in accordance with the teachings of the subject invention thereby facilitating separating and purification procedures. Elimination of by-product formation also contributes to the obtention of high end-product yields.

DETAILED DESCRIPTION OF THE INVENTION

The present invention relates to certain novel polycyclic compounds and processes for their synthesis. More particularly, the novel intermediates and processes of this invention provide a new synthetic route for the preparation of known pharmaceutically valuable 3-oxo-19-nor-Δ⁴-steroids.

In one aspect, this invention is directed to a process for preparing 3-oxo-19-nor-Δ⁴-steroids from 10-[3-substituted-alkyl]desA-steroids of the partial formula:

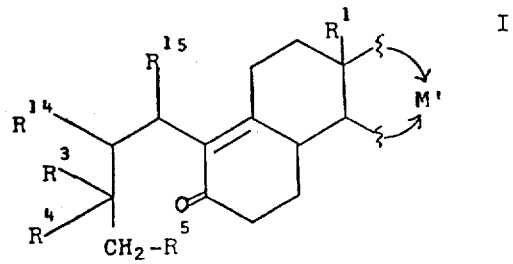

wherein M' represents the remaining rings of the steroid nucleus, i.e., the D ring; $R^{14}$ and $R^{15}$ are each independently hydrogen or lower alkyl; $R^3$ or $-OR^6$; $R^4$ is hydrogen; $R^6$ is monocyclic carbocyclic aryl-lower alkyl, hydrogen, acyl or a radical of the formula

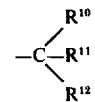

wherein each of $R^{10}$, $R^{11}$ and $R^{12}$ when taken alone is independently lower alkyl; $R^5$ is hydrogen or lower alkyl; and $R^1$ is lower primary alkyl containing from 1 to 5 carbons.

The invention sought to be patented in its process aspect is contained in the following flow diagrams, captioned Reaction Scheme A and Reaction Scheme B, which schematically detail the preparation of 3-oxo-19-nor-Δ⁴-steroids represented by the Formula VI (Reaction Scheme B) from 10-[3-substituted-alkyl]-desA-steroids represented by Formula I (Reaction Scheme A). Only the partial formulas are shown since the remainder of the structure does not enter into the reaction. The inventive steps include steps (e), (f), (g), (h) and (i).

REACTION SCHEME A
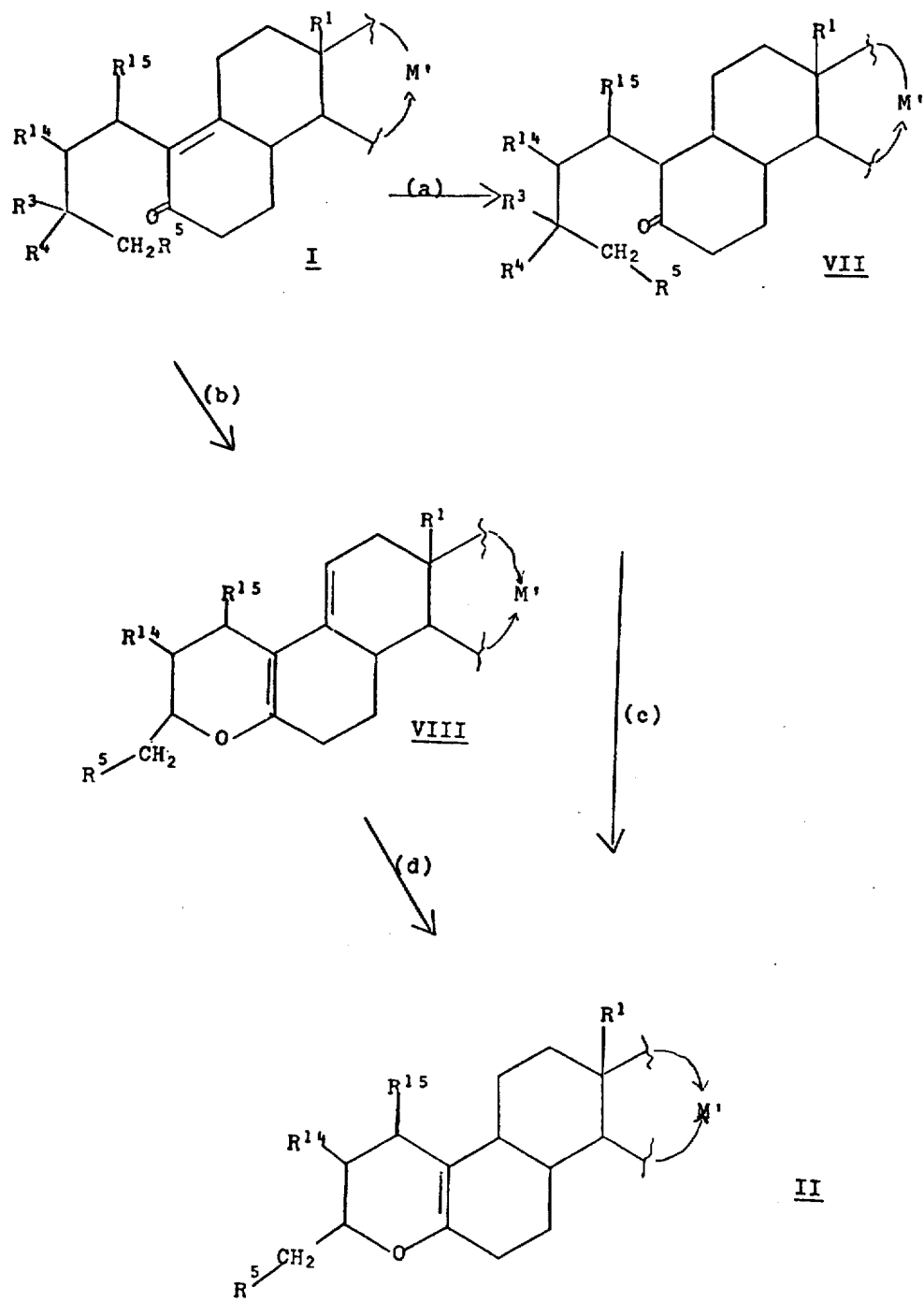

REACTION SCHEME B

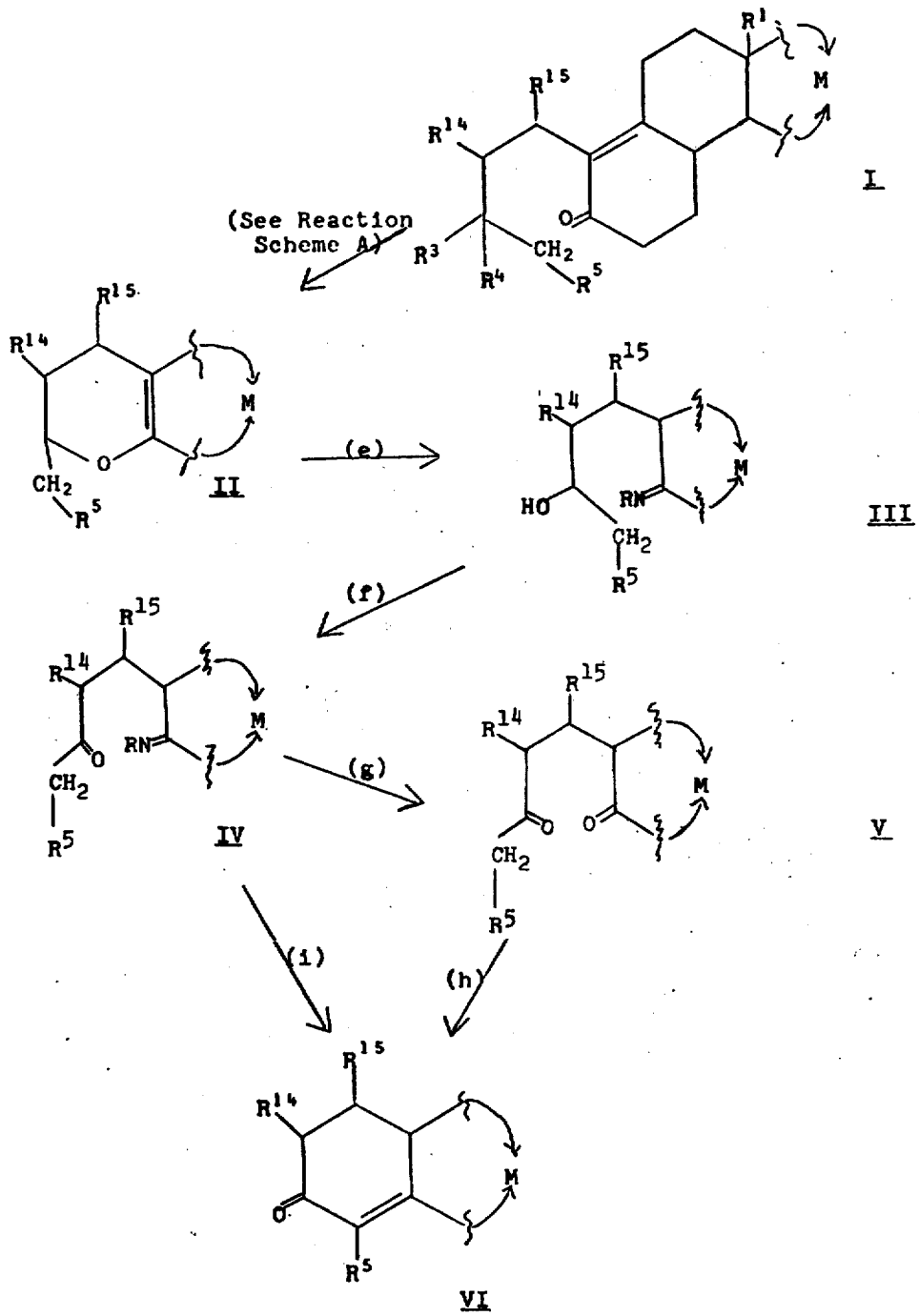

In Reaction Schemes A and B, $R^3$, $R^4$, $R^5$, $R^{14}$, $R^{15}$ and M' are defined as aforesaid; R is lower alkoxy, hydroxy or a radical of the formula $$-N\begin{matrix}X\\Y\end{matrix}$$

wherein X and Y are each independently lower alkyl; M represents the remainder of the steroid nucleus, i.e., the B, C and D rings; and $R^1$ is primary lower alkyl having from 1 to 5 carbons.

As used throughout the specification and appended claims, the term lower alkyl denotes a straight or branched chain saturated hydrocarbyl group containing from 1 to 7 carbon atoms, inclusive, and includes methyl, ethyl, isopropyl, butyl and the like. The term primary alkyl group denotes an alkyl group having its valence bond from a carbon bonded to at least two hydrogens. The term monocyclic carbocyclic aryl denotes a phenyl or substituted phenyl group. Substituted phenyl radicals have one or more than one of the same or different substituents attached to any position available for substitution. Substituents on the aryl group are, for example, lower alkyl, e.g., methyl, ethyl and the like, etherified hydroxyl, such as, lower alkoxy, e.g., methoxy, ethoxy, and the like. The term monocyclic carbocyclic aryl-lower alkyl comprehends, for example, phenyl-lower alkyl, e.g., benzyl, 1-phenylethyl, 2-phenylethyl and the like. The term hydrocarbyl groups denotes a monovalent substituent consisting solely of carbon and hydrogen. The term hydrocarbylene denotes a divalent substituent consisting solely of carbon and hydrogen and having its valence bonds from different carbons. The term aliphatic with reference to hydrocarbyl or hydrocarbylene denotes groups containing no aromatic unsaturation, but which can be otherwise saturated or unsaturated, i.e., an alkylene or alkyl, or an aliphatic group containing olefinic or acetylenic unsaturation. The term acyl group denotes a group consisting of the residue of a hydrocarbyl carboxylic acid of up to 20 carbon atoms exemplified by the lower alkanoic acids, e.g., acetic, propionic, butyric; the monocyclic aryl carboxylic acids, e.g., benzoic and toluic acid, formed by removal of the hydroxyl portion of the carboxyl group.

The 3-oxo-19-nor-$\Delta^4$-steroids of Formula VI which can be prepared in accordance with Reaction Schemes A and B above have been only partially represented therein since the remainder of the molecular structure either does not enter into the reaction or is transformed and then returned to its original structure during the reaction sequence. It will be appreciated that the unadorned molecular structure represented by M and M' as defined aforesaid can bear groups elsewhere in the nucleus uneffected by process conditions, such as, for example, not being limited thereof, at C-13, primary alkyl groups, such as methyl, ethyl or propyl; at C-17$\alpha$, i.e., alkyl groups, such as, methyl, ethyl, or propyl or at C-17$\beta$, alkoxy groups such as methoxy or ethoxy, or an ester of hydrocarbon carboxylic acid having up to 8 carbons, such as acetoxy, propionyloxy or benzoyloxy carbonyl. It should be noted that groups containing unsaturation such as at C-17$\alpha$, i.e., alkenyl groups such as, vinyl and allyl; and alkynyl groups, such as, ethynyl and propargyl, should not be inserted in the indicated at a point in the reaction sequence prior to a catalytic hydrogenation step. Furthermore, if a secondary hydroxy group is desired at C-17$\beta$, then suitable protecting groups, such as alkoxy or ester groups should be provided during the aforesaid reaction sequence, which protective groups may be removed during the last step of the sequence in a manner known per se. Additionally, an oxo group at C-17 may be transformed into a nitrogen derivative during the course of the reaction and then regenerated prior to the end of the sequence.

The processes of the present invention will now be generally described so as to enable one skilled in the art to practice the invention.

The 10-[3-substituted-alkyl]-$\Delta^{(9-10)}$ starting reactants represented by the partial Formula I in Reaction Scheme A may be obtained according to procedures described hereinafter and in U.S. Pat. 3,544,598, and abandoned U.S. Patent applications Ser. No. 633,730, filed Apr. 26, 1967 and 633,693, filed Apr. 26, 1967. The tricyclic compounds represented by Formula I can be named either as derivatives of benz[e]indenes or as desA-steroids and both designations are employed herein.

The enol-ethers represented by the Formula II can be obtained by sequential routes (a) and (c) of Reaction Scheme A. The 10-[3-substituted-alkyl]-$\Delta^{(9-10)}$-desA-steroids of Formula I are first hydrogenated in accordance with step (a) of Reaction Scheme A to yield the 3-oxo-saturated compounds of Formula VII. The hydrogenation is suitably conducted using a noble metal catalyst, such as, palladium, platinum or rhodium, with the preferred catalyst being palladium. These catalysts can be employed in the form of the metal alone or can be deposited on suitable support material, with carbon being preferred. The hydrogenation is conducted in the presence of a tri-lower alkyl amine, such as, triethylamine in an inert organic solvent such as a hydrocarbon, e.g., toluene, benzene; or lower alcohol, such as methanol or ethanol. The hydrogenation can be conducted under ambient conditions, i.e., atmospheric pressure and room temperature, although these conditions are not critical and higher or lower temperatures and pressures can also be suitably employed.

The enol-ethers of Formula II can be obtained from the 3-oxo-saturated compounds of Formula VII in accordance with step (c) of Reaction Scheme A by cyclizing the latter compounds. The cyclization may be effected by heating the 3-oxo-saturated compounds of Formula VII to a temperature of between 50°C. and 150°C., preferably at a temperature range of 75°C. to 95°C. The cyclization is conducted in the presence of a mineral or organic acid catalyst. An organic acid such as aryl sulfonic acid, e.g., p-toluene sulfonic acid is preferred.

Alternatively, the enol-ethers of Formula II can be obtained via sequential process routes (b) → (d). Thus, the 10-[3-substituted-alkyl]-$\Delta^{(9-10)}$-desA-steroids of Formula I are cyclized in accordance with step (b) of Reaction Scheme A to yield the novel 4-oxa-$\Delta^{(5-10),(9-11)}$ compounds of Formula VIII. The cyclization is suitably effected by the application of heat in the presence of a mineral acid, such as sulfuric acid or hydrogen halides, e.g., hydrochloric acid; or an organic acid, preferably an aryl sulfonic acid such as benzene-sulfonic acid or p-toluene sulfonic acid. The cyclization reaction can be conducted in any suitable inert organic solvent, preferably however, a hydrocarbon, such as, benzene or toluene is employed. The reaction is conveniently carried out at the reflux temperature of the solvent although lower reaction temperatures can also be employed consistent with carrying out the reaction in a minimum of time without undue difficulty. When the 10-[3-substituted-alkyl]-$\Delta^{(9-10)}$-desA-steroid of Formula I is defined so that $R^4$ is hydrogen and $R^3$ is —$OR^6$ wherein $R^6$ is hydrogen, the cyclization can be effected by the application of heat alone, the above indicated acids or a combination of both.

The enol-ethers of Formula II can be obtained by a novel selective hydrogenation of the dienes represented by Formula VIII in accordance with step (d) of Reaction Scheme A. The hydrogenation can be suitably effected by employing a noble metal catalyst such as, palladium, platinum and rhodium with the preferred catalyst being palladium. It is preferred to deposit the catalyst on a suitable support material, carbon being found to be most convenient for the purpose. The hydrogenation is suitably conducted in the presence of an inert organic solvent, preferably, a hydrocarbon such as benzene or toluene. Ambient conditions of room temperature and atmospheric pressure are generally preferred to avoid significant hydrogenation of the $\Delta^{(9-11)}$ bond. The hydrogenation must be effected under basic conditions. A most suitable base has been found to be a tri-lower alkylamine, such as, triethylamine.

It is presumed that any of the substituents which may be present on the unadorned molecular structure as previously defined are already present. However, it will be appreciated that certain of these substituents need not be present and can be conveniently introduced into the steroid nucleus at a convenient point in the process. It has been found particularly convenient to introduce at the C-17 position at this stage in the process alkynyl groups, particularly the ethynyl group when such steroid is the desired end-product. The enol-ethers represented by Formula II wherein the C-17 position is carbonyl, can be alkynylated with a suitable organo-metallic acetylide. Exemplary of the suitable alkynylating agents to effect the C-17 substitution are alkali acetylides, such as, lithium acetylide, potassium acetylide, sodium acetylide and the like. The reaction is carried out in liquid ammonia in a suitable solvent system, such as, for example, an ether, e.g., tetrahydrofuran or a hydrocarbon, e.g., toluene. The reaction is conveniently effected at the reflux temperature of the reaction medium although temperatures of between −60° to −30°C. are suitable.

Other substituents if not already present on the starting steroid nucleus can be introduced by methods known to those skilled in the art. For example, C-17 alkyl substituent can be introduced by alkylation agents, such as, for example, Grignard reagents or metal alkyls by known means.

A significant aspect of the instant invention lies in the conversion of the enol-ethers represented by Formula II to the 3-oxo-19-nor-$\Delta^4$-steroids represented by the Formula VI in accordance with process steps (e) → (f) → (g) → (h) or alternatively via process steps (e) → (f) → (i) as depicted in Reaction Scheme B. In this process aspect, the invention can be generally described as residing in the concept of trapping the potential carbonyl function of the enol-ether represented by Formula II as a nitrogen derivative represented by the radical =NR wherein R is defined as aforesaid.

The nitrogen derivatives represented by Formula III can be obtained in accordance with step (e) of Reaction Scheme B from the enol-ethers represented by the Formula II by treating the later compounds with a reagent of the formula $$NH_2-R \qquad \qquad IX$$

wherein R is defined as aforesaid.

It has been found preferable to carry out the conversion to the nitrogen derivatives of Formula III [step (e)] wherein the nitrogen reagent of Formula IX, in the form of its corresponding inorganic or organic acid addition salt is employed. Suitably, the salt may be formed with an inorganic mineral acid, especially from sulfuric acid or a hydrohalic acid, e.g., hydrochloric, hydrobromic or hydroiodic acid or an organic acid such as an aliphatic organic acid, e.g., lower alkanoic acids such as acetic acid, propionic acid or oxalic acid, or aryl carboxylic acids, e.g., benzoic acid. In general, any acid strong enough to form the addition salt can be used.

Preferred agents of the Formula IX are those wherein R is lower alkoxy, especially methoxy.

The conversion of the enol-ethers of Formula II to the hydroxy-nitrogen derivatives represented by Formula III is suitably conducted by treating the enol-ether with the nitrogen reagent represented by Formula IX in a suitable inert organic solvent, such as, pyridine; dimethylformamide; an ether, e.g., tetrahydrofuran or dioxane; or a lower secondary alkanol, e.g., isopropanol. By inert organic solvent as employed herein is meant an organic solvent which dissolves the reactants but will not interact or interfere with their action.

Other equally suitable solvents than those exemplified immediately heretofore will readily suggest themselves to those skilled in the art. The reaction can be suitably carried out within a temperature range of 0°C. to 60°C. However, for convenience room temperature is preferred. The reaction times and temperatures employed are not critical and simply represent convenient conditions consistent with carrying out the reaction in a minimum of time without undue difficulty.

When the reagent of Formula IX is employed as its salt, the reaction must be carried out in the presence of base. Exemplary of the bases which can be used are pyridine, tri-lower alkyl amines, e.g., triethylamine; alkali metal salts derived from organic carboxylic acids, e.g., sodium acetate or alkali metal hydroxide, e.g., sodium hydroxide and the like.

The oxo-nitrogen derivatives of Formula IV can be obtained by oxidizing the hydroxy-nitrogen compounds represented by Formula III in accordance with step (f) of Reaction Scheme B. In general, the oxidation reaction can be effected by any suitable oxidizing agent. As the oxidizing reagent or method, there can be utilized chromic acid in acetone; the Oppenhauer oxidation, e.g., metallic alkoxide, cf. R.V. Oppenhauer, *Rec. trav. Chem.* 56, 137 (1937) or silver carbonate in refluxing hydrocarbon such as xylene.

However, it should be noted in those cases wherein the oxo-nitrogen derivative of Formula IV contains a substituent which is not inert to the oxidizing agent, special conditions must be employed. Thus, when the C-17 position contains, for example, an unsaturated moiety, e.g., an alkynyl group such as the ethynyl group, the reaction must be effected under very mild oxidizing conditions. One suitable mild oxidizing method which has been found to be particularly convenient is the Snatzke method, which is fully described in Chem Ber., 94, 729 (1961). Briefly, in the Snatzke method, a chromium trioxide-sulfuric acid reagent in a dimethylformamide solvent is employed. It has been found that superior results can be achieved when adapting the Snatzke oxidation to the instant invention by modifying the conditions employed therein. Specifically, it has been found desirable to use twice the amount of acid that Snatzke specifies. The oxidation reaction using this reagent can be conducted at a temperature range of from about −10° to about +40°C. However, it has been found especially advantageous to conduct the reaction within a temperature range of from about 0°C. to about 25°C. Conveniently the reaction can be carried out using any inert organic solvent although N,N-di-lower alkyl-lower alkanoyl amides such as dimethylformamide or dimethylacetamide have been found to be particularly convenient.

The diketo compounds represented by Formula V may be obtained from the keto-nitrogen derivatives of Formula IV in accordance with step (g) of Reaction Scheme B by hydrolysis exchange. Suitably, the reaction can be carried out using a reaction partner containing reactive carboned functions such as dialkylketones, e.g., acetone; or an organic keto-acid such as pyruvic acid or levulinic acid. The reaction is conducted in the presence of a mineral acid, such as sulfuric acid or hydrohalic acid, e.g., hydrochloric acid at a temperature range of from about 0°C. to 50°C. It has been found convenient, however, to carry out the reaction at room temperature. Any inert organic solvent suitable for the conversion may be employed. Exemplary are hydrocarbons, e.g., toluene or chlorinated hydrocarbon, e.g., chloroform. Nitrogen derivatives of the C-17 oxo group, if present, will also be converted back to the oxo moiety under the aforesaid conditions.

The desired 3-oxo-19-nor-Δ⁴ end-product steroids represented by Formula VI can be obtained by cyclizing the diketo compounds of Formula V in accordance with step (h) of Reaction Scheme B. The cyclization cially aryl sulfonic acids such as p-toluene sulfonic acid.

In another aspect, this invention comprehends certain of the novel compound which are partially represented in Reaction Schemes A and B. These compounds can be more completely represented by the structural formula shown below:

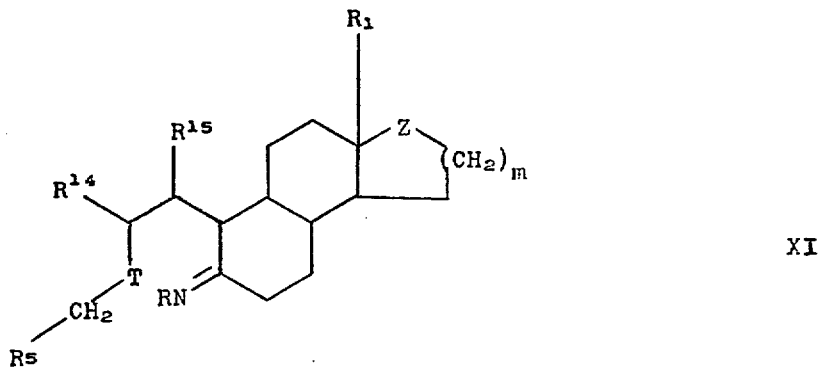

XI can be effected under either basic or acidic conditions by means known to the art. The basic cyclization can be effected with dilute alkali hydroxide, e.g., potassium hydroxide or sodium hydroxide, which has been found to be particularly convenient. Exemplary of the useful acids which may be employed to effect the cyclization are inorganic mineral acids, especially hydrohalic acids, e.g., hydrochloric, hydrobromic and the like or an organic acid such as, a lower alkanoic or aryl carboxylic acid, especially substituted aryl sulfonic acids, such as, benzene sulfonic acid or p-toluene sulfonic acid. The reaction can be suitably conducted at a temperature range of from 50° to the reflux temperature of the solvent with the latter conditions being preferred. The reaction can be carried out in any suitable inert organic solvent with a hydrocarbon, such as, benzene, toluene or xylene being preferred.

Alternatively, the keto-nitrogen derivatives of Formula IV can be directly converted to 3-oxo-19-nor-Δ⁴-steroids represented by Formula VI in accordance with wherein Z is carbonyl, $>C=NR$ or a group of the formula

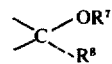

$R^7$ is hydrogen or lower acyl; $R^8$ is hydrogen or lower aliphatic hydrocarbyl; T is carbonyl or

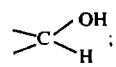

$m$ is an integer having a value of from 1 or 2; and R, $R^1$, $R^5$, $R^{14}$, and $R^{15}$ are defined as aforesaid.

As is apparent, the above formulas are derived from Reaction Schemes A and B wherein M is a preferred moiety of the partial formula

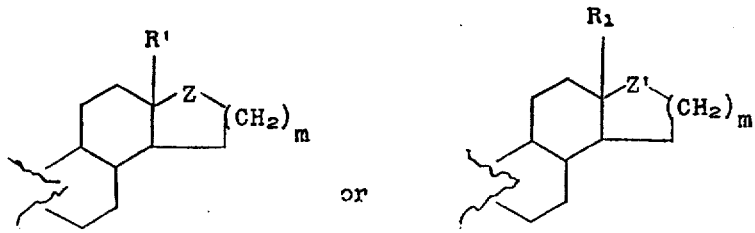

step (i) of Reaction Scheme B. The direct conversion comprises an acid catalyzed hydrolysis and cyclization. It is effected using an aqueous organic or mineral acid in an inert water miscible organic solvent, preferably lower alcohol, e.g., methanol; or tetrahydrofuran or dioxane. The reaction is conveniently accomplished at the reflux temperature of the solvent although the temperature of the reaction is not critical and temperatures below reflux can be suitably employed consistent with carrying out the reaction in a minimum of time without undue difficulty. Exemplary of the mineral acids are sulfuric acid or a hydrohalic acid, e.g., hydrochloric acid; exemplary of the organic acids are lower alkanoic acids, e.g., acetic acid or aryl carboxylic acids espeand M' is a preferred moiety of the partial formula

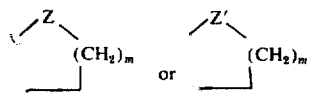

wherein Z, Z', $m$ and $R^1$ are defined as aforesaid.

Further preferred compounds are those wherein $R^{14}$ and $R^{15}$ are hydrogen; $R^5$ is hydrogen; $R^4$ is hydrogen; $R^6$ is

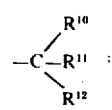

wherein each $R^{10}$, $R^{11}$ and $R^{12}$ is lower alkyl, especially methyl; R is lower alkoxy, especially methoxy; m is 1 and Z is carbonyl or

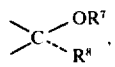

wherein $R^7$ is hydrogen; $R^8$ is lower hydrocarbyl, especially lower alkynyl and $R^1$ is methyl, ethyl or propyl.

Exemplary of the compounds of formula XI are 6-[3-oxo-butyl]-3a,β-ethyl-7-methoxyimino-3α-ethynyl-3-hydroxy-perhydro[3H]benz[e]indane; 6-[3-oxo-butyl]-3a,β-methyl-3,7-dimethylimino-perhydro-[3H]-benz[e]indane; 6-(3-hydroxybutyl)-3a,β-ethyl-3α-ethynyl-3β-hydroxyperhydro-[3H]benz[e]indan-7-one-N,N-dimethylhydrazone; 6-(3-hydroxybutyl)-3a,β-methyl-3,7-dimethoxyimino-perhydro[3H-]benz[e]indane; 6-(3-hydroxybutyl)-3a,β-ethyl-3,7-dimethoxyimino-[3H]benz[e]indane, 6-(3-oxo-butyl)-3a,β-methyl3,7-dimethoxyimino-perhydro-[3H]benz[e]indane.

The 10-[3-substituted-alkyl]-$\Delta^{(9,10)}$ starting reactants represented by the partial Formula I in Reaction Scheme A may be obtained according to the procedures escribed in U.S. Pat. 3,544,598, and abandoned patent application Ser. No. 633,693, filed Apr. 26, 1967; and Ser. No. 604,124, filed Dec. 23, 1966. The derivatives of Formula I not specifically exemplified therein may be obtained by methods available to those skilled in the art. For example, the derivatives of Formula I, wherein $R^6$ is a monocyclic carbocyclic aryl lower alkyl, such as, benzyl can be obtained from the same starting material, i.e., 5-chloro-2-pentanone, which is hereinafter described for preparing other derivatives of Formula I. Thus, 5-chloro-2-pentanol is reacted with a benzyl halide, preferably the bromide in benzene solvent in the presence of base, suitably, sodium hydride. Analagous procedures to those hereinafter described are then used to convert the thus obtained 5-chloro-2-benzyloxy-pentane to the corresponding compounds of Formula I. Similarly, derivatives of Formula I wherein $R^6$ is acyl can be obtained by methods described in the hereinafter attached subsection. Derivatives of Formula I wherein $R^6$ is hydrogen can be obtained from the corresponding compounds wherein $R^6$ is acyl by base hydrolysis in accordance with methods known to the art.

The utility of the 3-oxo-$\Delta^4$-19-nor-steroids of Formula VI, in addition to being hereinabove described, is also described in the aforesaid U.S. Patent and patent applications.

The following examples are intended to illustrate the invention and are not to be construed to be limitative thereof. Temperatures are given in °C.

EXAMPLE 1

(±)-6-(3-Hydroxybutyl)-3aβ-ethyl-3α-ethynyl-3-hydroxy-7-methoxy-imino-perhydro[3H]benz[e]indane 1.5 G. of (±) 2-methyl-6a,β-ethyl-7α-ethynyl-2,3,4,4b,5,6,6a,7,8,9a,9b,10,11-tetradecahydro-cyclopenta[5,6]naphtho[2,1-b]pyran-7-ol was dissolved in pyridine (5 ml.) containing water (0.25 ml.) and then treated with methoxyamine hydrochloride (1 g). After standing at room temperature for 20 hr. (one spot on tlc) the reaction was quenched with brine and the organic materials were isolated with dichloromethane.

The organic extract was washed with water and taken to dryness in vacuo to yield the oxime ether (±)-6-(3-hydroxybutyl)-3aβ-ethyl-3α-ethynyl-3-hydroxy-7-methoxyimino-perhydro[3H]benz[e]-indane as a solid. A sample of this material was crystallized from isopropyl ether to yield pure material, m.p. 163°–165°.

Anal. Calcd for $C_{22}H_{35}NO_3$: C, 73,09; H, 9.76; N, 3.87. Found: C, 73.23; H, 9.81; N, 3.81.

EXAMPLE 2

(±)-6-[3-oxo-butyl]-3a,β-ethyl-7-methoxyimino-3α-ethynyl-3-hydroxy-perhydro[3H]benz[e]indane 1 G. of the crude alcohol-oxime ether, (±)-6-(3-hydroxybutyl)-3aβ-ethyl-3α-ethynyl-3-hydroxy-7-methoxyimino-perhydro[3H]benz[e]indane in dimethylformamide (DMF) (10 ml.) was treated at 5° with a solution of chromium trioxide (1 g.) in DMF (10 ml.) to which had been added concentrated sulphuric acid (.5 ml.) dissolved in DMF (3 ml.). The mixture was then warmed to room temperature and left to stir for 1 hr.

Dichloromethane and aqueous sodium bicarbonate solution were added. The organic phase was then washed with brine, aqueous sodium bisulphite solution (10 ml; 2%), dried over $MgSO_4$ and taken to dryness in vacuo to give the ketone (±)-6-(3-oxo-butyl)-3a,β-ethyl-7-methoxyimino-3α-ethynyl-3-hydroxy-perhydro[3H]benz[e]indane as a glass.

EXAMPLE 3

(±) -6-(3-oxo-butyl)-3a,β-ethyl-3α-ethynyl-3-hydroxyperhydro[3H]benz[e]indane-7-one 140 Mg.; of the glassy ketone purified by chromatography (±)-6-(3-oxo-butyl)-3a,β-ethyl-7-methoxyimino-3α-ethynyl-3-hydroxyperhydro[3H]benz[e]indane was dissolved in chloroform (5 ml) and treated with levulinic acid in hydrochloric acid (1N; 9:1; 5 ml) and left to stir at room temperature for 48 hr. (followed by tlc).

The mixture was quenched with dichloromethane and the organic phase was washed with saturated aqueous sodium bicarbonate solution. Removal of the solvents in vacuo furnished the diketone (±)-6-(3-oxo-butyl)-3a,β-ethyl-3αethynyl-3-hydroxyperhydro[3H]benz[e]indan-7-one as an oil. The use of pyruvic acid gave the same result.

This material failed to crystallize and appeared as one spot on tlc.

EXAMPLE 4

(±)-13β-Ethyl-17α-ethynyl-17-hydroxy-gon-4-en-3-one a. 128 Mg. of the crude diketone, (±)-6-(3-oxo-butyl)-3a,β-ethyl-3α-ethynyl-3-hydroxyperhydro[3H]benz[e]indan-7-one in benzene (5 ml.) containing p-toluenesulphonic acid (25 mg.) was heated at reflux for 1 hr. (monitored by tlc). Dilution with more benzene and washing with aqueous sodium bicarbonate solution (saturated) gave a semi-solid on removal of the solvents in vacuo. Crystallization from dichloromethane/isopropyl ether mixture yielded (±)-13β-ethyl-17α-ethynyl-17-hydroxy-gon-4-en-3-one as a solid, m.p. 198°–201°. Recrystallization from hexane/acetone mixture raised the melting point to 204°–206°.

b. The same material was prepared as follows: 430 mg. of the crude oxidation product (±)-6-(3-oxo-butyl)-3a,β-ethyl-7-methoxyimino-3α-ethynyl-3-hydroxyperhydro[3H]benz[e]indane in methanol (15 ml.) was treated with aqueous hydrochloric acid (4N; 7.5 ml.) and heated at reflux for 2 hr. The products were isolated with dichloromethane to yield off-white solid which was chromatographed on silica gel (0.2–0.5 mm mesh; 80 ml). Elution with 5%, 10% and 20% ethyl acetate/benzene mixture gave one spot material (by tlc) m.p. 185°–195°.

Crystallization from hexane/acetone gave (with mother liquor materials) pure (±)-13β-ethyl-17α-ethynyl-17-hydroxy-gon-4-en-3-one.

EXAMPLE 5

(±)-6-(3-Hydroxybutyl)-3a,β-methyl-3,7-dimethoxyimino-perhydro[3H]benz[e]indane

747 Mg. of the enol ether, (±)-2-methyl-6a,β-methyl-2,3,4,4b,5,6,8,9,9a,9b,10,11-dodecahydrocyclopenta(5,6)naphtho(2,1-b)pyran-7,(6aH)-one (a 1:1 mixture of the possible isomers at $C_2$) in pyridine (4 ml) was treated with water (0.1 ml) and methoxyamine hydrochloride (500 mg.) and left to stand at room temperature for 48 hr. Dilution with dichloromethane and extraction with brine gave the dioxime (954 mg) on removal of the solvent in vacuo.

Chromatography over silica gel (0.2–0.5 mesh; 50 g.) yielded the pure dioxime on elution with 10% and 20% ethyl acetate/benzene mixtures. The material failed to crystallize.

EXAMPLE 6

(±)-6-(3-oxo-butyl)-3a,β-methyl-3,7-dimethoxyimino-perhydro[3H]benz[e]indane

640 Mg. of the dioxime ether, (±)-6-(3-hydroxybutyl)-3aβ-methyl-3,7-dimethoxyimino-perhydro[3H]benz[e]indane in xylene (30 ml.) was treated with silver carbonate on celite (3 g.) and heated at reflux under nitrogen for 1 hr. (followed by tlc). The solids were filtered off and washed with benzene. Removal of the solvents in vacuo gave an oil which crystallized from hexane to yield pure ketone (±)-6-(3-oxo-butyl)-3a,β-methyl-3,7-dimethoxyimino-perhydro[3H-]benz[e]indane, m. p. 110°–111°.

Anal. Calcd for $C_{20}H_{32}N_2O_3$: C, 68.93; H, 9.26; N, 8.04. Found: C, 69.09; H, 9.24; N, 8.14.

EXAMPLE 7

(±)-19-Nor-androst-4-en-3,17-dione

107 Mg. of the ketone (±)-6-(3-oxo-butyl)-3a,β-methyl-3,7-dimethoxyimino-perhydro[3H]benz[e]indane in methanol (5 ml.) was treated with hydrochloric acid (6N; 1 ml.) and heated at reflux for 2.5 hr. (followed by tlc). The mixture was cooled and worked up with dichloromethane and saturated aqueous sodium bicarbonate solution. Removal of the organic solvents in vacuo gave the crude material which crystallized from acetone/hexane to give (±)-19-nor-androst-4-en-3,17-dione.

EXAMPLE 8

(±)-6-(3-Hydroxybutyl)-3a,β-methyl-3β-hydroxy-7-methoxyimino-perhydro[3H]benz[e]indane 837 Mg. of the enol ether, (±)-2-methyl-6aβ-methyl-2,3,4,4b,5,6,6a,7,8,9,9a,9b,10,11-tetradecahydrocyclopenta(5,6)naphtho (2,1-b)pyran-7-β-ol (a 1:1 mixture of isomers at $C_2$ [i.e. prepared from the 1:1 mixture (±)-2-methyl-6aβ-methyl-2,3,4,4b,5,6,8,9,9a,9b,10,11-dodecahydrocyclopenta(5,6)naphtho(2,1-b)pyran-7.(6aH)-one by lithium aluminum hydride reduction]) was dissolved in pyridine (5 ml.) containing methoxyamine hydrochloride (500 mg.) and water (0.2 ml.). After standing at room temperature for 48 hr. (tlc indicated no change after 24 hr.) the products were isolated with dichloromethane and brine. Removal of the solvents in vacuo gave an oil which was chromatographed on silica gel (0.2–0.5 mm mesh; 60 g.). Elution with 30%–75% ethyl acetate benzene mixtures yielded the diol, (±) -6-(3-Hydroxybutyl)-3a,β-methyl-3β-hydroxy-7-methoxyimino-perhydro[3H]benz[e]indane, as a glass.

EXAMPLE 9

(±)-19-Nor-androst-4-en-3,17-dione

417 Mg. of the diol, (±)-6-(3-hydroxybutyl)-3a,β-methyl-3β-hydroxy-7-methoxyimino-perhydro[3H]benz[e]indane in DMF (5 ml.) was treated with a mixture of chromium trioxide/sulphuric acid in DMF (500 mg/0.25ml/5.5 ml) and left to stand at room temperature for 2 hr. (followed by tlc.) Dilution with water, saturated sodium bicarbonate solution and extraction with dichloromethane gave the crude diketone as an oil. This material was dissolved in methanol (15 ml.) containing hydrochloric acid (4N; 7.5 ml) and heated at reflux for 2 hr. (tlc monitoring). Dilution with brine and extraction with dichloromethane furnished (±)-19-nor-androst-4-en-3,17-dione as an oil.

Chromatography on silica gel (0.2–0.5 mm mesh; 50 ml) furnished one spot material, m.p. 145°–155° on elution with 10% and 20% ethyl acetate-benzene mixtures. Crystallization from dichloromethane-isopropyl ether mixture gave pure (±)-19-nor-androst-4-en-3,17-dione, m.p. 155°–157°.

EXAMPLE 10

(±)-6[3-Tertiarybutoxybutyl]-3a,β-ethyl-4,5,8,9,9a,9b-hexahydro-1H-benz[e]inden-3,7-(2H,3aH)-dione 25.4 G. of the triketoether, (±)-trans-4-(3-oxo-tertiarybutoxy-octyl)-7a,β-ethylperhydroindan-1,5-dione, was dissolved in tertiary butanol (70 ml.) and added to a mixture of powdered sodium hydroxide (1 g.) in tertiary butanol (250 ml.) at 55° under nitrogen. After stirring at 55° for 1 hour, brine was added (1 liter) and the products were isolated with ether and worked up as usual to yield an oil (23.6 g.). Chromatography on alumina (2 kg.; grade III, neutral; Woelm) gave the pure material (±)-6[3'tertiarybutoxybutyl]-3a,β-ethyl-1,2,4,5,8,9,9a, 9b-octahydro-benz[e]inden-3,(3aH)7-dione as a clear oil on elution with ether-pet.-ether 30°–60° mixtures (15%25%). A sample was distilled to give a colorless oil; b.p. 180° at. 0.5 mm (Kugal Rohr).

EXAMPLE 11

(±)-2 Methyl-6a,β-ethyl-2,3,4,6,8,9,9a,9b,10,11-decahydrocyclopenta [5.6]naphtho[2,1-b]pyran-7(6aH)-one 14.1 G. of the tricyclic material, (±)-6[3-tertiarybutoxybutyl]-3a,β-ethyl-4,5,8,9,9a,9b-hexahydro-1H-benz[e]inden-3,7-(2H,3aH)-dione, was dissolved in benzene, treated with p-toluenesulfonic acid (.6 g.) and heated under reflux for 4½ hours. After cooling, the reaction mixture was worked up as usual to give the diene (±)-2-methyl-6a,β-ethyl-2,3,4,6,8,9,9a,9b,10,11-decahydrocyclopenta[5,6-]naphtho[2,1-b]pyran-7(6aH)-one, under $N_2$ at 4° in the dark. A sample crystallized twice from hexane had m.p. 109°–116°.

EXAMPLE 12

(±)-6-(3-Hydroxybutyl)-3a,β-methyl 3.7-dimethoxyimino-perhydro [3H]benz[e]indane 980 Mg. of (±)-2-methyl-6a,β-methyl-2,3,4,4b,5,6,8,9,9a,9b,10,11-dodecahydrocyclopenta[5,6]-naphtho-[2,1-b]-pyran-7(6aH)-one in 5 ml of pyridine containing 0.1 ml. water and 550 mg of hydroxylamine hydrochloride was kept at room temperature for 24 hours. Extraction with dichloromethane gave the (±)-6-(3-hydroxybutyl)-3a,β-methyl-3,7-dimethoxyimino-perhydro[3H]benz[e]indane oxime as an oil.

EXAMPLE 13

(±)-6-(3-Oxo-butyl)-3a,β-methyl-3,7-dimethoxyimino-perhydro[3H]benz[e]indane

700 Mg of (±)-6-(3-hydroxybutyl)-3a,β-methyl-3,7-dimethoxyimino-perhydro[3H]benz[e]indane was dissolved in benzene containing 4 ml. of methyl-ethyl-ketone and 700 mg. of aluminum isopropoxide was heated at reflux for 24 hours. The reaction was quenched with 50 ml. (2%) of aqueous caustic soda and the product, (±)-6-(3-oxo-butyl)-3a,β-methyl-3,7-dimethoxyimino-perhydro[3H]benz[e]indane was isolated using methylene chloride.

EXAMPLE 14

(±)-6-(3-Hydroxybutyl)-3a,β-ethyl-3α-ethynyl-3β-hydroxyperhydro[3H]benz[e]indan-7-one-N,N-dimethyl hydrazone 1 G. of (±)-2-methyl-6a,β-ethyl-ethynyl-2,3,4,4b, 5, 6, 6a, 7, 8, 9a, 9b, 10, 11-tetradecahydrocyclopental[5,6]-naphtho-[2,1-b]pyran 7-ol in 5 ml. of pyridine containing 0.1 ml. of water and 0.5 g. of N,N-dimethyl hydrazine was left to stand at room temperature for 24 hours. Work up of the organic materials and isolation with dichloromethane yielded (±)-6-(3-hydroxybutyl)3a,β-ethyl-3α-ethynyl-3β-hydroxyperhydro[3H]benz[e]indan-7-one-N,N-dimethyl hydrazone.

EXAMPLE 15

(±)-3-(4-Tertiarybutoxypentyl)-6aβ-methyl-1,2,3,5,6,6a-hexahydrocyclopenta[f][1]benzopyran-7(8H)-one (±)-2-(2-Diethylaminoethyl)-6-(4-tertiarybutoxypentyl)tetrahydropyran-2-ol (28 g.) dissolved in xylene (140 ml.) was added to a mixture of 2-methylcyclopentan-1,3-dione (13.7 g.), xylene (280 ml.) and acetic acid (140 ml.) and heated at reflux for 45 min. The cold reaction mixture was washed with water, aqueous sodium bicarbonate solution and dried over sodium sulphate.

Removal of the solvents and chromatography over alumina (870 g., grade III neutral) yielded the pure above-titled dienol ether (22 g.) as an oil.

Calc. C, 76.27; H, 9.89; Found: C, 76.47; H, 10.03

The ultraviolet spectrum showed $\lambda_{max}$ 253 mµ ($\epsilon_{max}$ 17,700).

EXAMPLE 16

(±)-3-(4-Tertiarybutoxypentyl)-6aβ-methyl-1,2,3,5,6,6a,7,8-octahydrocyclopenta[f][1]benzopyran-7β-ol (±)-3-(4-Tertiarybutoxypentyl)-6aβ-methyl-1,2,3,5,6,6a-hexahydrocyclopenta[f][1]benzopyran-7(8H)-one (23.1 g.) dissolved in tetrahydrofuran (464 ml.) was added to a slurry of lithium aluminum hydride (4.6 g.) in tetrahydrofuran (232 ml.) at −10°.

The mixture was then stirred a further 45 min. at 0° and treated with water. The solids were filtered off and the solvents were removed to yield the alcohol (23.1 g.).

A sample of the titled product on crystallization from hexane had m.p. 97°-101°.

Calc. C, 75.78; H, 10.41; Found: C, 76.01; H, 10.28
u.v. $\lambda_{max}$ 252mµ ($\epsilon_{max}$; 18,700).

EXAMPLE 17

(±)-3-(4-Tertiarybutoxypentyl)6aβ-methyl-1,2,3,5,6,6a,7,8,9,9a-decahydrocyclopenta[f][1]benzopyran-7β-ol (±)-3-(4-Tertiarybutoxypentyl)-6aβ-methyl-1,2,3,5,6,6a,7,8-octahydrocyclopenta[f][1]benzopyran-7-ol (22.5 g.) was dissolved in toluene (450 ml.) and treated with 5% palladium-on-carbon (3.4 g.) and hydrogenated at room temperature and pressure.

After the uptake of one mole of hydrogen, the solids were filtered off and the solvents removed in vacuo to give the above-titled enol ether (23.1 g.) as a pale yellow oil.

A sample on chromatography over alumina (Neutral; grade III) yielded analytical material showing no strong u.v. adsorbtion.

Calc. C, 75.38; H, 10.93; Found: C, 75.15; H, 10.93
I.R. (chloroform) showed bands at 3625 (OH) and 1680 cm$^{-1}$ (enol ether).

EXAMPLE 18

(±)-3-(4-Tertiarybutoxypentyl)-6aβ-methyl-perhydrocyclopenta[f][1]benzopyran-4a,7β-diol (±)-3-(4-Tertiarybutoxypentyl)-6aβ-methyl-1,2,3,5,6,6a,7,8,9,9a-decahydrocyclopenta[f][1]benzopyran-7β-ol (22.1 g.) in acetone (220 ml.) was treated with aqueous sulphuric acid (1N; 110 ml.) and left at room temperature for 3 hrs. Most of the acetone was removed in vacuo at 35° and the organic materials were isolated with ether.

Removal of the ether gave the above-titled hemiketal (21.5 g. as a glass).

A sample on chromatography over alumina (Neutral grade III) yielded material showing bands in the infrared at 3625 cm$^{-1}$ (OH) and 1200 cm$^{-1}$ (O-t-butyl) and no enol ether bands.

EXAMPLE 19

(±)-Trans-4(3-oxo-7-tertiarybutoxy-octyl)-7a,β-methylperhydroindan-1,5-dione (±)-3-(4-Tertiarybutoxypentyl)-6aβ-methyl-perhydrocyclopenta[f][1]benzopyran-4a,7β-diol (17.4 g.) dissolved in acetone (700 ml.) was cooled to 15° and treated over 20 mins. with a solution of chromium trioxide (12.7 g.) dissolved in aqueous sulphuric acid (63.5 ml.)

After stirring a further 2 hrs. at room temperature, the products were isolated from benzene to yield the above-titled triketone (15.4 g.) as an oil.

A sample on distillation (molecular still B.P. 195°-205° at .01 mm.) showed bands in the infra red spectrum at 1735 (cyclopentanone), 1708 (cyclohexanone and alkyl ketone) and 1200 cm$^{-1}$ (O-t-butyl).

Calc. C, 72.49; H, 9.95; Found: C, 72.21; H, 10.00

EXAMPLE 20

(±)-6-(3-Tertiarybutoxybutyl)-3a,β-methyl-4,5,8,9,9a,9b-hexahydro-1-H-benz[e]inden-3,7-(2H,3aH)-dione (±)-Trans-4-(3-oxo-7-tertiarybutoxy-octyl)-7aβ-methyl perhydroindan-1,5-dione (13.8 g.) dissolved in tertiarybutyl alcohol (38 ml.) was added to a solution of sodium hydroxide (544 mg.) in tertiary butyl alcohol (136 ml.) under nitrogen.

The mixture was stirred at 55° for 1 hr. hr., with acetic acid (1 ml.) and the organic materials were isolated with benzene.

Removal of the benzene in vacuo gave the above-titled tricyclic material (11.9 g.) as a pale yellow oil.

The product showed strong absorbtion in the u.v. at $\lambda_{max}$ 247 mμ ($\epsilon_{max}$; 13,000) and had the characteristic bands in the infrared spectrum at 1730 (cyclopentanone) and 1660 and 1600 cm$^{-1}$ (cyclohexenone).

EXAMPLE 21

(±)-2-Methyl-6aβ-methyl-2,3,4,4b,6,8,9,9a,9b,10,11-decahydrocyclopenta[5,6]naphtho[2,1-b]pyran-7-(6aH)-one (±)-6-(3-Tertiarybutoxybutyl)-3aβ-methyl-4,5,8,9,9a,9b-hexahydro-1H-benz[e]inden-3,7(2H,3aH) dione (10 g.) was dissolved in benzene (300 ml.) containing p-toluene sulphonic acid (500 mg.) and heated at reflux for 3½ hrs.

The cold reaction mixture was washed with aqueous sodium bicarbonate solution and the solvents were removed in vacuo to yield the above-titled dienol ether (8 g.) as an oil showing bands in the infra red spectrum at 1735 (cyclopentanone) and 1645 cm$^{-1}$ (dienol ether).

The u.v. spectrum showed $\lambda_{max}$ 249 mμ ($\epsilon_{max}$ 17,500).

EXAMPLE 22

(±)-2-Methyl-6aβ-methyl-2,3,4,5,6,8,9,9a,9b,10,11-dodecahydrocyclopenta[5,6]naphtho[2,1-b]pyran-7(6aH)one (±)-2-Methyl-6aβ-methyl-2,3,4,6,8,9,9a,9b,10,11-decahydrocyclopenta[5,6]naptho[2,1-b]pyran-7(6aH)-one (8 g.) was dissolved in toluene (200 ml.) containing triethylamine (1.5 ml.) and 5% palladium-on-carbon (1.5 g.) and hydrogenated at room temperature and pressure until one mole of hydrogen had been consumed.

The solids were filtered off and the solvents removed in vacuo to yield the above-titled enol ether as an oil. Chromatography over alumina (Neutral; Grade III) yielded pure product (6 g.).

Calc. C, 78.98; H, 9.42; Found: C, 78.79; H, 9.55

Infra red spectrum showed bands at 1740 (cyclopentanone) and 1680 cm$^{-1}$ (enol ether).

The same material was also prepared as follows: (±)-6-(3-tertiarybutyoxybutyl)-3aβ-methyl-4,5,8,9,9a,9b-hexahydro-1H-benz[e]inden-3,7-(2H,3aH)-dione (1.5 g.) was dissolved in ethanol (25 ml.) containing triethylamine (0.15 ml.) and 5% P/c. (200 mg.) and hydrogenated at room temperature and pressure until no more hydrogen was consumed.

The solids were filtered off and the solvents were removed in vacuo to yield racemic 6-(3)tertiarybutoxybutyl)-3aβ-methylperhydro-benz[e]indane-3,7-dione as an oil.

This material showing infra red bands at 1735, 1705 and 1200 cm$^{-1}$ was dissolved in benzene (25 ml.) containing p-toluene sulphonic acid (100 mg.) and heated at reflux for 4 hrs.

After washing the cold reaction mixture with brine and removal of the solvents in vacuo, the residue was filtered through a column of alumina (Neutral; grade III) to yield the above-titled pure enol ether.

EXAMPLE 23

(±)-2-Methyl-6aβ-methyl-2,3,4,4b,5,6,8,9,9a,9b,10,11-dodecahydrocyclopenta[5,6]naphtho[2,1-b]pyran-7β-ol The enol ether 2-methyl-6aβ-methyl-2,3,4,4b,5,6,8,9,9a,9b, 10,11-dodecahydrocyclopenta[5,6]naphtho[2,1-b]pyran-7(6aH)one (3 g.) in ether (20 ml.) was added to a slurry of lithium aluminum hydride (600 mg.) in ether (25 ml.) at 10°.

After stirring a further one hour at room temperature, water was added and the solids were filtered off. Removal of the solvents yielded (3 g.) of a glass showing bands in the infra red at 3600 (OH) and 1680 cm$^{-1}$ (enol ether).

EXAMPLE 24

(±)-13β-Ethyl-17α-ethynyl-17-hydroxy-gon-4-en-3-one

The product of Example 14 (±)-6-(3-hydroxybutyl)-3aβ-ethyl-3α-ethynyl-3β-hydroxyperhydro[3H-]benz[e]indan-7-one-N,N-dimethylhydrazone was converted to the above-titled compound via the intermediates (±-6-(3-oxo-butyl)-3a,β-ethyl-3α-ethynyl-3-hydroxyperhydro[3H]benz[e]-indan-7-one-N,N-dimethylhydrazone and (±)-6-(3-oxo-butyl)-3aβ-ethyl-3α-ethynyl-3-hydroxyperhydro [3H]benz[e]indan-7-one utilizing the procedures of Examples 2, 3 and 4.

EXAMPLE 25

(±)-2-Methyl-6aβ-ethyl-2,3,4,4b,5,6,8,9,9a,9b,10,11-dodecahydrocyclopenta[5,6]naphtho[2,1-b]pyran-7(6aH)-one 33.3 G. of the crude dienol ether (±)-2-methyl-6aβ-ethyl 2,3,4,6,8,9,9a,9b,10,11-decahydrocyclopenta[5,6]naphtho[2,1-b]pyran-7(6aH)-one in toluene (300 ml.) was treated with 5 g. of a carbon-palladium catalyst and triethylamine (2.5 ml.) and then hydrogenated at room temperature and pressure till no more hydrogen was consumed (≈2.8 liters; overnight). The solids were filtered off and the solvents removed in vacuo to give the product, (±)-2-methyl-6aβ-ethyl-2,3,4,4b,5,6,8,9,9a,9b,10,11-dodecahydrocyclopenta[5,6]naphtho[2,0-b]pyran-7(6aH)-one, as an oil. This was a 1:1 mixture of C₂ isomers. A sample crystallized twice from hexane melted at 111°–115°. Repeated cyrstallizations from hexane yielded the product enriched (≈ 85%) in one isomer, m.p. 118°–122°.

EXAMPLE 26

(±)-2-Methyl-6aβ-ethyl-7α-ethynyl-2,3,4,4b,5,6,6a,7,8,9,9a,9b,10,11-tetradecahydrocyclopenta[5,6]naphthol[2,1-b]pyran-7-ol Liquid ammonia (600 ml.) was saturated with dry acetylene (passed through a trap at -72°) for 45 minutes and then treated with postassium metal (3 g.), with continuous acetylene passage. This mixture was then stirred for a further 30 minutes and then treated over 20 minutes with the crude enol ether (±)-2-methyl-6aβ-ethyl-2,3,4,4b,5,6,8,9,9a,9b,10,11-dodecahydrocyclopenta[5,6]naphtho[2,1-b]pyran-7(6aH)-one (8 g., m.p. 118°–122°)dissolved in dry tetrahydrofuran (120 ml.). The whole reaction mixture was then stirred for a further 2 hours. Ether (400 ml.) was then added and half of the ammonia was allowed to distill off. Solid ammonium chloride (20 g.) was then added followed by water (180 ml.) 15 minutes later. The acetylene was disconnected and the products were worked up with ether in the usual manner. Crystallization of the products from hexane yielded pure (±)-2-methyl-6aβ-ethyl-7α-ethynyl-2,3,4,4b,5,6,6a,7,8,9-,9a,9b,1-

11-tetradodecahydrocyclopenta[5,6]naphtho[2,1-b]pyran-7-ol (5.8 g.), m.p. 138°–143°.

Anal. Calcd. for $C_{21}H_{30}O_2$: C, 80.21; H, 9.62; Found: C, 80.19; H, 9.48

Ir bands at $3600^{-1}$ (-OH), $3300^{-1}$ (H-C ≡ C-), $1675^{-1}$ (O-C ≡ C).

EXAMPLE 27

13-β-Ethyl-gon-4-ene-3,17-dione

The product of Example 25, (±)-2-methyl-6aβ-ethyl-2,3,4,4b, 5,6,8,9,9a,9b,10,11-dodecahydrocyclopenta[5,6]naphtho[2,1-b] pyran-7(6aH)-one was converted into the above-titled product by utilizing the procedures of Examples 5, 6 and 7 via the following intermediates: (±)-6-(3-hydroxybutyl)-3aβ-ethyl-3,7-dimethoxyimino-perhydro[3H]benz[eindane and (±)-6-(3-oxo-butyl)-3aβ-ethyl-3,7-dimethoxyimino-perhydro[3H]benz[eindane.

EXAMPLE 28

(±)-2-Methyl-6a,β-methyl-7α-ethynyl-2,3,4,4b,5,6,6a,7,8,9-,9a,9b,1-

11-tetradecahydrocyclopenta[5,6]naphtho[2,1-b]pyran-7-ol (±)-2-Methyl-6a,β-methyl-2,3,4,4b,5,6,8,9,9a,9b,10,11-dodecahydrocyclopenta[5,6]naphtho[2,1-b]pyran-7(6aH)-one was converted to the above-titled compound by utilizing the procedure of Example 26.

We claim:
1. Compounds of the formula

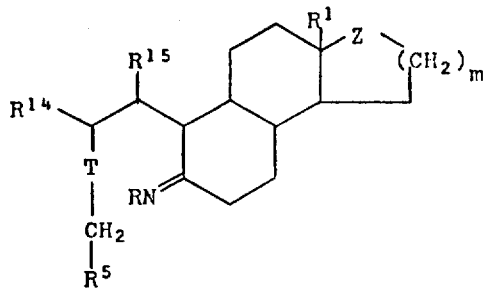

wherein Z is carbonyl,>C=NR or a group of the formula

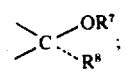

$R^7$ is hydrogen or lower alkanoyl or monocyclic aroyl; $R^8$ is hydrogen or lower aliphatic hydrocarbyl; m is an integer having a value of 1 or 2; R is lower alkoxy, hydroxy or a radical of the formula

wherein X and Y are each independently lower alkyl; $R^1$ is primary lower alkyl having from 1 to 5 carbons; $R^5$ is hydrogen or lower alkyl; $R^{14}$ and $R^{15}$ are each independently hyrogen or lower alkyl and T is carbonyl or a group of the formula

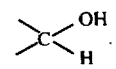

2. A compound as in claim 1, which is

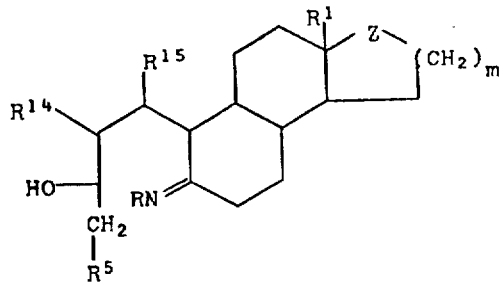

wherein R, $R^1$, $R^5$, $R^{14}$, $R^{15}$, Z and m are as defined in claim 1.

3. A compound as in claim 1, which is

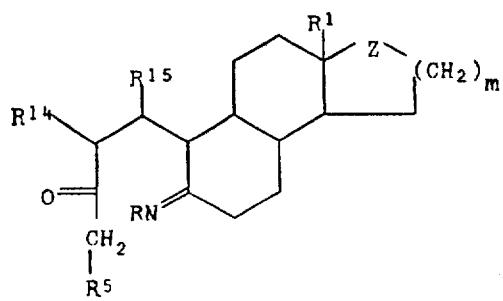

wherein R, $R^1$, $R^5$, $R^{14}$, $R^{15}$, Z and m are as defined in claim 1.

4. A compound as in claim 2 wherein $R^1$ is methyl or ethyl; $R^{14}$ and $R^{15}$ are both hydrogen; $R^5$ is methyl; R is lower alkoxy; Z is a group of the formula

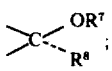

$R^7$ is hydrogen; $R^8$ is lower alkyl, lower alkenyl, or lower alkynyl and m is an integer having a value of 1.

5. A compound as in claim 3 wherein $R^1$ is methyl or ethyl; $R^{14}$ and $R^{15}$ are both hydrogen; $R^5$ is methyl; R is lower alkoxy; Z is a group of the formula

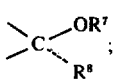

$R^7$ is hydrogen; $R^8$ is lower alkyl, lower alkenyl or lower alkynyl and m is an integer having a value of 1.

6. A process for preparing a compound of the formula

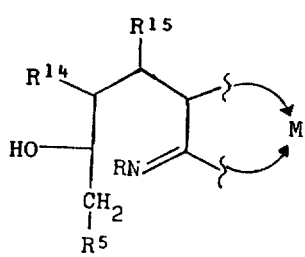

wherein R is hydroxy, lower alkoxy or a radical of the formula

wherein X and Y are each independently lower alkyl; $R^5$ is hydrogen or lower alkyl; $R^{14}$ and $R^{15}$ are each independently hydrogen or lower alkyl; and m is selected from the group consisting of the partial formulas

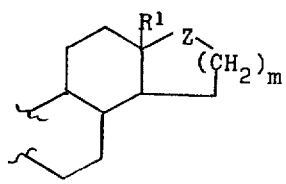

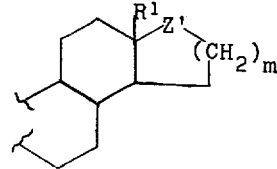

wherein Z is carbonyl, >C=NR or a group of the formula

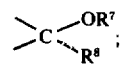

Z' is carbonyl or a group of the formula

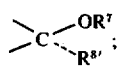

$R^{8'}$ is hydrogen or lower saturated aliphatic hydrocarbyl; $R^7$ is hydrogen or lower alkanoyl or monocyclic aroyl; $R^8$ is hydrogen or lower aliphatic hydrocarbyl; m is an integer having a value of 1 or 2; $R^1$ is methyl or ethyl;

which comprises treating a compound of the formula

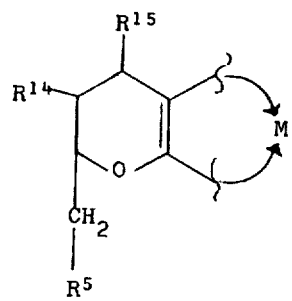

wherein $R^5$, $R^{14}$, $R^{15}$ and M are as defined above with the reagent or acid addition salt thereof of the formula
$NH_2R$
wherein R is defined as above,
in an inert organic solvent, provided, however, that when an acid addition salt is used, the reaction is carried out in the presence of base.

7. A process as in claim 6 wherein $R^{14}$ and $R^{15}$ are each hydrogen; $R^5$ is methyl and R is lower alkoxy and the reaction is carried out at a temperature of from 0° to 60°C.

8. A process as in claim 6 wherein $R^8$ is lower alkyl, lower alkenyl or lower alkynyl and $R^{8'}$ is lower alkyl.

* * * * *